(12) United States Patent
Saito et al.

(10) Patent No.: US 8,387,632 B2
(45) Date of Patent: Mar. 5, 2013

(54) CAMERA DEVICE, CLEANING CONTROL METHOD, AND CLEANING CONTROL PROGRAM

(75) Inventors: Kazumasa Saito, Kanagawa (JP); Hajime Matsumoto, Kanagawa (JP); Tetsurou Kajino, Tokyo (JP); Haruo Kogane, Kanagawa (JP); Jyouji Wada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 393 days.

(21) Appl. No.: 12/601,604

(22) PCT Filed: Jun. 11, 2008

(86) PCT No.: PCT/JP2008/001491
§ 371 (c)(1),
(2), (4) Date: May 10, 2010

(87) PCT Pub. No.: WO2008/152804
PCT Pub. Date: Dec. 18, 2008

(65) Prior Publication Data
US 2010/0212689 A1    Aug. 26, 2010

(30) Foreign Application Priority Data
Jun. 12, 2007   (JP) .................. 2007-154640

(51) Int. Cl.
*B08B 1/00*   (2006.01)
(52) U.S. Cl. .................... 134/116; 15/97.1; 15/103
(58) Field of Classification Search .................. 134/116; 15/97.1, 103
See application file for complete search history.

(56) References Cited

U.S. PATENT DOCUMENTS

| | | | | | |
|---|---|---|---|---|---|
| 5,406,413 | A | * | 4/1995 | Mogamiya | 359/511 |
| 6,554,210 | B2 | * | 4/2003 | Holt et al. | 239/284.2 |
| 6,983,628 | B2 | * | 1/2006 | Cho | 68/12.01 |
| 7,224,398 | B2 | * | 5/2007 | Wada | 348/373 |
| 7,388,722 | B2 | * | 6/2008 | Nomura et al. | 359/819 |
| 7,948,552 | B2 | * | 5/2011 | Noto | 348/340 |

FOREIGN PATENT DOCUMENTS

| | | | |
|---|---|---|---|
| JP | 01-313029 | A | 12/1989 |
| JP | 05-344396 | * | 12/1993 |
| JP | 06-303471 | * | 10/1994 |
| JP | 11-084470 | * | 3/1999 |
| JP | 2000-267181 | * | 9/2000 |

(Continued)

OTHER PUBLICATIONS

International Search Report for PCT/JP2008/001491.

*Primary Examiner* — Frankie L Stinson
(74) *Attorney, Agent, or Firm* — Pearne & Gordon LLP

(57) ABSTRACT

A camera apparatus (1) includes: a CCD (2) serving as an imaging device; a cleaning member (3) for performing cleaning of the front face of the CCD (2); and a cleaning controller (13) for controlling the movement of the cleaning member (3). Cleaning control is carried out so that when the cleaning of the CCD (2) is started, the cleaning member (3) is moved to a cleaning position located in front of and in proximity to the CCD (2), and when the cleaning of the CCD (2) is finished, the cleaning member (3) is moved to a retracted position retracted from the cleaning position. The camera apparatus itself is provided with the function of cleaning the imaging device, thereby enabling reduction in time and effort for a cleaning operation performed on the imaging device.

11 Claims, 14 Drawing Sheets

FOREIGN PATENT DOCUMENTS

| | | | |
|---|---|---|---|
| JP | 2003-018440 | * | 1/2003 |
| JP | 2003-018440 A | | 1/2003 |
| JP | 2003-161981 A | | 6/2003 |
| JP | 2004-201489 | * | 7/2004 |
| JP | 2005-138479 A | | 6/2005 |
| JP | 2005-284243 | * | 10/2005 |
| JP | 2006-100875 | * | 4/2006 |
| JP | 2007-047487 A | | 2/2007 |
| KR | 2006057456 | * | 5/2006 |

* cited by examiner (a)

(b)

(c)

ofcleaning of a foreign substance on the surface of the CCD.

CAMERA DEVICE, CLEANING CONTROL METHOD, AND CLEANING CONTROL PROGRAM

TECHNICAL FIELD

The present invention relates to a camera apparatus provided with the function of cleaning an imaging device.

BACKGROUND ART

Conventionally, an image pickup device such as a CCD has been used as an imaging device of a camera apparatus. A foreign substance such as dust or dirt might adhere to a surface of this CCD (i.e., a surface of a protection glass that protects an imaging face of the CCD). If a foreign substance is adhered to the surface of the CCD, the shadow of this foreign substance is unfavorably reflected on an image, which will degrade image quality. In particular, when an image of a high brightness object is taken, a depth of focus is increased upon stopping down of an aperture by an auto iris function, and a foreign substance on the surface of the CCD might be unfavorably seen as an image. To cope with this, there has conventionally been proposed a dust removal apparatus for removing a foreign substance adhered to a surface of a CCD of a camera apparatus. Such an apparatus is disclosed in Japanese Unexamined Patent Application Publication No. 2007-47487 (pp. 3-6, FIG. 1), for example.

In this conventional dust removal apparatus, at the time of removal of a foreign substance on the surface of the CCD, a lens of the camera apparatus is detached, and the dust removal apparatus is attached in place of this lens. Then, high pressure air is blown from an air blowing part of the dust removal apparatus, thereby blowing off and removing the foreign substance on the surface of the CCD.

However, in the case of the conventional dust removal apparatus, it is necessary to detach the lens of the camera apparatus and to attach the dust removal apparatus at the time of removal of a foreign substance on the surface of the CCD. Furthermore, after the removal of the foreign substance has been completed, it is necessary to detach the dust removal apparatus and to attach the lens. As described above, in the case of the conventional dust removal apparatus, at the time of cleaning of the surface of the CCD, it has been necessary to disassemble the camera apparatus and to assemble the camera apparatus again, and considerable time and effort have been required for a cleaning operation.

DISCLOSURE OF THE INVENTION

Problems to be Solved by the Invention

The present invention has been made in view of the above-described background. An object of the present invention is to provide a camera apparatus in which the camera apparatus itself is provided with the function of cleaning an imaging device, thus enabling reduction in time and effort for a cleaning operation performed on the imaging device.

Solution to the Problems

One aspect of the present invention provides a camera apparatus, and this camera apparatus includes: an imaging device; a cleaning member that is movable between a cleaning position located in front of the imaging device and in proximity to the imaging device, and a retracted position retracted from the cleaning position, and that performs cleaning of a front face of the imaging device; and a cleaning controller for controlling the movement of the cleaning member so as to move the cleaning member to the cleaning position when the cleaning is started, and so as to move the cleaning member to the retracted position when the cleaning is finished.

Another aspect of the present invention provides a cleaning control method, and this method is a cleaning control method used when cleaning of an imaging device of a camera apparatus is performed, wherein when the cleaning is started, a cleaning member is moved to a cleaning position located in front of the imaging device and in proximity to the imaging device, wherein cleaning of a front face of the imaging device is performed by the cleaning member, and wherein when the cleaning is finished, the cleaning member is moved to a retracted position retracted from the cleaning position.

Still another aspect of the present invention provides a cleaning control program, and this program is a cleaning control program that is stored in a memory, and that implements a cleaning function for performing cleaning of an imaging device of a camera apparatus, the cleaning control program causing a computer to execute: a process of moving, when the cleaning is started, a cleaning member to a cleaning position located in front of the imaging device and in proximity to the imaging device; a process of performing cleaning of a front face of the imaging device by the cleaning member; and a process of moving, when the cleaning is finished, the cleaning member to a retracted position retracted from the cleaning position.

As will be described below, other aspects exist in the present invention. Accordingly, the disclosure of this invention is intended to provide some aspects of the present invention, and is not intended to limit the scope of the invention described and claimed herein.

Figure 1:
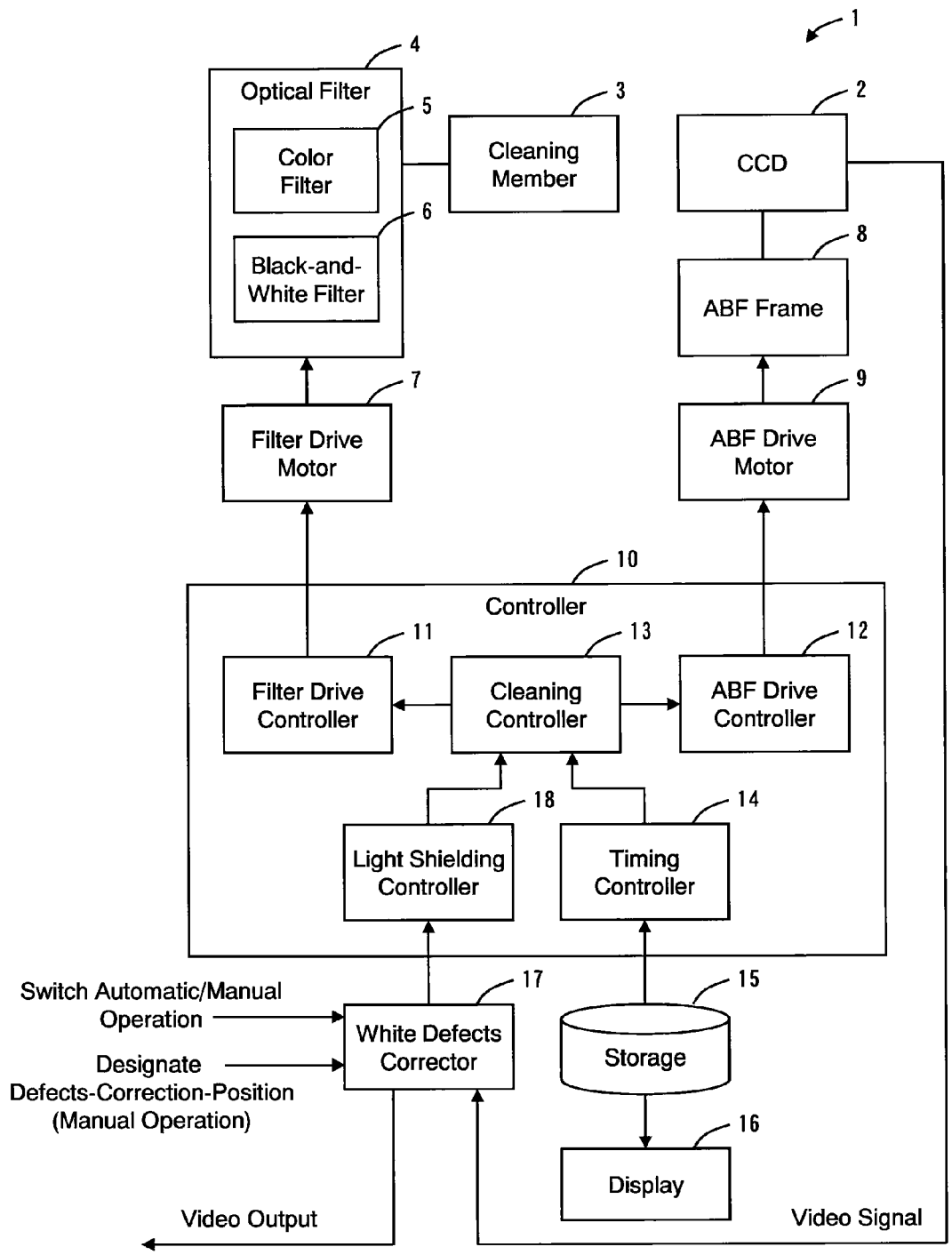
FIG. 1 is a block diagram of a camera apparatus according to an embodiment of the present invention.

DESCRIPTION OF THE REFERENCE CHARACTERS 1 camera apparatus
2 CCD
3 cleaning member
4 optical filter
7 filter drive motor
8 ABF frame
9 ABF drive motor
11 filter drive controller
12 ABF drive controller
13 cleaning controller
14 timing controller
15 storage
16 display
17 white defects corrector
18 light shielding controller
23 link member
25 rotation pin
27 connecting pin
30 elongated hole

BEST MODE FOR CARRYING OUT THE INVENTION

Hereinafter, the present invention will be described in detail. It is to be noted that the following detailed description and the appended drawings will not limit the present invention. Instead, the scope of the invention is defined by the appended claims.

A camera apparatus of the present invention has a structure including: an imaging device; a cleaning member that is movable between a cleaning position located in front of the imaging device and in proximity to the imaging device, and a retracted position retracted from the cleaning position, and that performs cleaning of a front face of the imaging device; and a cleaning controller for controlling the movement of the cleaning member so as to move the cleaning member to the cleaning position when the cleaning is started, and so as to move the cleaning member to the retracted position when the cleaning is finished.

With this structure, the cleaning of the front face of the imaging device (e.g., a surface of a CCD) can be performed by the cleaning member provided in the camera apparatus itself. In other words, the detachment of a lens, which has been performed in the conventional technology, is unnecessary at the time of removal of a foreign substance adhered to the front face of the imaging device. Accordingly, it is possible to perform the cleaning of the imaging device without disassembling the camera apparatus, thereby facilitating a cleaning operation performed on the imaging device.

Further, the camera apparatus of the present invention may have a structure including: an optical filter that can enter and leave an inserted position located in front of the imaging device and on an optical path leading to the imaging device, and a withdrawn position withdrawn from the inserted position; and a filter movement controller for controlling the entering and leaving movement of the optical filter in conjunction with the movement of the cleaning member so as to place the optical filter at the inserted position when the cleaning member is at the retracted position, and so as to place the optical filter at the withdrawn position when the cleaning member is at the cleaning position.

With this structure, the cleaning member and the optical filter are operated in conjunction with each other, thus placing the optical filter at the inserted position when the cleaning member is at the retracted position. Accordingly, shooting can be performed by the imaging device when the cleaning of the imaging device is not performed. Further, the cleaning member and the optical filter are operated in conjunction with each other, thus placing the optical filter at the withdrawn position when the cleaning member is at the cleaning position. Accordingly, the cleaning of the imaging device can be performed when shooting is not performed by the imaging device.

Furthermore, the camera apparatus of the present invention may have a structure including a link member, which is rotatable by a drive force transmitted from a driver, and through which the cleaning member and the optical filter are connected, and the connected position of the cleaning member is set at a position farther away from the rotation center of the link member than the connected position of the optical filter.

With this structure, the cleaning member and the optical filter are operated in conjunction with each other via the link member, thus enabling the shared use of a drive source for moving the cleaning member, and for moving the optical filter. Accordingly, a drive source for moving the cleaning member does not have to be additionally provided, which enables size reduction of a product, and allows the product cost to be kept at a low level. Moreover, in this case, the connected position of the cleaning member is located at a position (tip-end-side position) farther away from the rotation center of the link member than the connected position of the optical filter; therefore, the amount of movement of the cleaning member (i.e., the amount of movement from the cleaning position to the retracted position) will be greater than the amount of movement of the optical filter (i.e., the amount of movement from the inserted position to the withdrawn position). Thus, when the optical filter is moved from the position (i.e., the withdrawn position) outside the optical path to the position (i.e., the inserted position) on the optical path, the cleaning member can be reliably moved from the position (i.e., the cleaning position) on the optical path to the position (i.e., the retracted position) outside the optical path.

Further, the camera apparatus of the present invention may have a structure in which the cleaning member is a wipe-off cleaning member for performing wipe-off cleaning on the front face of the imaging device by being brought into contact with the front face of the imaging device, and the cleaning controller controls the movement of the cleaning member so that the wipe-off cleaning member is moved back and forth in a direction along the front face of the imaging device when the wipe-off cleaning is performed.

With this structure, the wipe-off cleaning is performed by bringing the wipe-off cleaning member into contact with the front face of the imaging device. Thus, dust or dirt adhered to the imaging device can be wiped off, and a foreign substance on the imaging device can be more reliably removed as compared with the case where air is blown to blow off a foreign substance as in the conventional technology.

Furthermore, the camera apparatus of the present invention may have a structure in which a relative position of the imaging device and the wipe-off cleaning member is changeable between a contact position at which the front face of the imaging device and the wipe-off cleaning member are brought into contact with each other, and a non-contact position at which the front face of the imaging device and the wipe-off cleaning member are not brought into contact with each other, and the cleaning controller controls the relative position of the imaging device and the wipe-off cleaning member so as to place the imaging device and the wipe-off cleaning member at the non-contact position when the wipe-off cleaning member is moved to the cleaning position, and so as to place the imaging device and the wipe-off cleaning member at the contact position when the wipe-off cleaning is performed.

With this structure, when the wipe-off cleaning member is moved to the cleaning position, the wipe-off cleaning member and the imaging device are placed at the non-contact position, and therefore, the wipe-off cleaning member can be prevented from interfering with the imaging device. Then, the wipe-off cleaning of the imaging device can be performed by placing the wipe-off cleaning member and the imaging device at the contact position.

Moreover, the camera apparatus of the present invention may have a structure including a focus adjustment part for adjusting a focus by moving the imaging device in an optical axis direction, and the cleaning controller moves the imaging device in the optical axis direction using the focus adjustment part, thereby controlling the relative position of the imaging device and the wipe-off cleaning member when the wipe-off cleaning is performed.

With this structure, the imaging device can be moved in the optical axis direction by utilizing the focus adjustment part. Accordingly, it is unnecessary to additionally provide a drive source for changing the relative position of the imaging device and the wipe-off cleaning member, thus enabling size reduction of the product, and allowing the product cost to be kept at a low level.

Further, the camera apparatus of the present invention may have a structure in which the cleaning controller controls the relative position of the imaging device and the wipe-off cleaning member so as to place the imaging device and the wipe-off cleaning member at the contact position when the wipe-off cleaning member is moved forth, and so as to place the imaging device and the wipe-off cleaning member at the non-contact position when the wipe-off cleaning member is moved back.

With this structure, the wipe-off cleaning is performed only when the wipe-off cleaning member is moved forth (i.e., moved from one end toward the other end). Thus, a foreign substance such as dust or dirt, which is wiped off from the front face of the imaging device by the wipe-off cleaning, can be collected into the other end.

Furthermore, the camera apparatus of the present invention may have a structure including a timing controller for controlling timing at which the cleaning is performed.

With this structure, the timing at which the cleaning is performed is controlled, thereby performing the cleaning at suitable timing. Thus, for example, the cleaning can be prevented from being performed excessively, which enables an increase in durability of the cleaning member.

Moreover, the camera apparatus of the present invention may have a structure including: a storage for storing cleaning history information including information on the number of times the cleaning has been performed; and a display for displaying the cleaning history information.

With this structure, the cleaning history information including information on the number of times the cleaning has been performed is displayed, and therefore, the cleaning history information can be confirmed. Thus, it is possible to perceive the timing of maintenance (repair and/or exchange) of the cleaning member.

Besides, the camera apparatus of the present invention may have a structure in which the cleaning member includes a light shielding portion having a light shielding property, and the cleaning controller controls the movement of the cleaning member so that when the cleaning member is at the cleaning position, the light shielding portion is placed at a light shielding position for blocking the optical path leading to the imaging device.

With this structure, upon placement of the cleaning member at the cleaning position, the light shielding portion is placed at the light shielding position, and light shielding of the imaging device is carried out. By carrying out light shielding of the imaging device in this manner, a white defects correction process can be performed on the imaging device, for example. In addition, when this camera apparatus is used in a videoconference system or the like, for example, the light shielding of the imaging device is carried out as described above, thereby preventing an image of this side from being taken to enable privacy protection.

Further, the camera apparatus of the present invention may have a structure including a white defects corrector for performing a white defects correction process on the imaging device, and the cleaning controller controls the movement of the cleaning member so as to place the light shielding portion at the light shielding position when the white defects corrector performs the white defects correction process.

With this structure, the light shielding of the imaging device can be carried out by placing the light shielding portion at the light shielding position. By carrying out the light shielding of the imaging device in this manner, the white defects correction process can be performed on the imaging device.

A cleaning control method of the present invention is a cleaning control method used when cleaning of an imaging device of a camera apparatus is performed, in which when the cleaning is started, a cleaning member is moved to a cleaning position located in front of the imaging device and in proximity to the imaging device, in which cleaning of a front face of the imaging device is performed by the cleaning member, and in which when the cleaning is finished, the cleaning member is moved to a retracted position retracted from the cleaning position.

With this method, similarly to the foregoing description, the cleaning of the front face of the imaging device (e.g., the surface of a CCD) can be performed by the cleaning member provided in the camera apparatus itself. In other words, the detachment of a lens, which has been performed in the conventional technology, is unnecessary at the time of removal of a foreign substance adhered to the front face of the imaging device. Accordingly, it is possible to perform the cleaning of the imaging device without disassembling the camera apparatus, thereby facilitating a cleaning operation performed on the imaging device.

In the cleaning control method of the present invention, the cleaning member may be a wipe-off cleaning member for performing wipe-off cleaning on the front face of the imaging device by being brought into contact with the front face of the imaging device, the wipe-off cleaning member and the imaging device may be placed at a non-contact position, at which they are not brought into contact with each other, when the wipe-off cleaning member is moved to the cleaning position, and the wipe-off cleaning member and the imaging device may be placed at a contact position, at which they are brought into contact with each other, when the wipe-off cleaning is performed.

With this method, similarly to the foregoing description, when the wipe-off cleaning member is moved to the cleaning position, the wipe-off cleaning member and the imaging device are placed at the non-contact position, and therefore, the wipe-off cleaning member can be prevented from interfering with the imaging device. Then, the wipe-off cleaning of the imaging device can be performed by placing the wipe-off cleaning member and the imaging device at the contact position. In this case, the wipe-off cleaning is performed by bringing the wipe-off cleaning member into contact with the front face of the imaging device. Thus, dust or dirt adhered to the imaging device can be wiped off, and a foreign substance on the imaging device can be more reliably removed as compared with the case where air is blown to blow off a foreign substance as in the conventional technology.

A cleaning control program of the present invention is a cleaning control program that is stored in a memory, and that implements a cleaning function for performing cleaning of an imaging device of a camera apparatus, the cleaning control program causing a computer to execute: a process of moving, when the cleaning is started, a cleaning member to a cleaning position located in front of the imaging device and in proximity to the imaging device; a process of performing cleaning of a front face of the imaging device by the cleaning member; and a process of moving, when the cleaning is finished, the cleaning member to a retracted position retracted from the cleaning position.

With this program, similarly to the foregoing description, the cleaning of the front face of the imaging device (e.g., the surface of a CCD) can be performed by the cleaning member provided in the camera apparatus itself. In other words, the detachment of a lens, which has been performed in the conventional technology, is unnecessary at the time of removal of a foreign substance adhered to the front face of the imaging device. Accordingly, it is possible to perform the cleaning of the imaging device without disassembling the camera apparatus, thereby facilitating a cleaning operation performed on the imaging device.

In the present invention, a cleaning means and a cleaning control means are provided in a camera apparatus, thereby allowing the camera apparatus itself to be provided with the function of cleaning an imaging device, and enabling reduction in time and effort for a cleaning operation performed on the imaging device.

Hereinafter, a camera apparatus according to an embodiment of the present invention will be described with reference to the drawings. In the present embodiment, the description will be made about a case in which a camera apparatus is used as a surveillance camera or the like by way of example. The camera apparatus of the present embodiment is provided with an automatic cleaning function, and this automatic cleaning function is implemented by a program stored in a memory of the camera apparatus.

Referring to FIGS. 1 to 10, the configuration/structure of the camera apparatus according to the embodiment of the present invention will be described. FIG. 1 is a block diagram illustrating the configuration of the camera apparatus according to the present embodiment. Hereinafter, the overall configuration of the camera apparatus will be first described with reference to FIG. 1.

As illustrated in FIG. 1, the camera apparatus 1 includes: a CCD 2 serving as an image pickup device; a cleaning member 3 located at a position in front of the CCD 2 and in proximity thereto; and an optical filter 4 located on an optical path provided forward of the cleaning member 3. In this embodiment, the CCD 2 is equivalent to an imaging device of the present invention. It should be noted that the term "front of the CCD 2" refers to the surface side of the CCD 2, and may also refer to the upstream side of the optical path leading to an imaging face of the CCD 2 (i.e., the left side of the CCD 2 in FIGS. 7 to 10). Further, other than the CCD 2, for example, a CMOS or the like may be used as the image pickup device.

The cleaning member 3 is brought into contact with the front face of the CCD 2 to perform wipe-off cleaning. This cleaning member 3 is formed by a nonwoven fabric or the like, for example, and is an approximately rectangular pad-like or brush-like member (see FIGS. 4 to 6). In this embodiment, the cleaning member 3 is equivalent to a cleaning means (i.e., a wipe-off cleaning means) of the present invention. It should be noted that the term "front face of the CCD 2" refers to the surface of the CCD 2 (i.e., the surface of a protection glass for protecting the imaging face of the CCD 2), and when an optical filter (not illustrated) is integrally provided on the protection glass of the CCD 2, the term refers to the surface of this optical filter.

Furthermore, the cleaning member 3 has a light shielding property, and is made of an opaque plastic material with zero light transmission, for example. Accordingly, this cleaning member 3 may be equivalent to a light shielding means of the present invention.

The optical filter 4 includes: a color filter 5 used when shooting is performed in a color mode; and a black-and-white filter 6 used when shooting is performed in a black-and-white mode. For example, an IR-cut filter is used as the color filter 5, and an optical glass (raw glass) is used as the black-and-white filter 6. This optical filter 4 is moved upward/downward by a drive force of a filter drive motor 7, thereby performing switching between the color filter 5 and the black-and-white filter 6. This optical filter 4 is equivalent to an optical filter means of the present invention. In addition, the filter drive motor 7 is equivalent to a drive means of the present invention.

Furthermore, the camera apparatus 1 includes: an ABF frame (Auto Back Focus frame) 8 to which the CCD 2 is attached; and an ABF drive motor 9 for moving the CCD 2 in an optical axis direction by deforming the ABF frame 8 as will be described later. Essentially, these ABF frame 8 and ABF drive motor 9 are provided in order to perform focus adjustment by moving the CCD 2 forward/backward (in the optical axis direction). In this embodiment, the ABF frame 8 and the ABF drive motor 9 are equivalent to a focus adjustment means of the present invention.

The camera apparatus 1 includes a controller 10 formed by a CPU and so on. The controller 10 includes: a filter drive controller 11 for controlling the filter drive motor 7; an ABF drive controller 12 for controlling the ABF drive motor 9; and a cleaning controller 13 for performing after-mentioned cleaning control by utilizing the filter drive controller 11 and/or the ABF drive controller 12. In this embodiment, the cleaning controller 13 is equivalent to a cleaning control means of the present invention, and the filter drive controller 11 is equivalent to a filter entering/leaving control means of the present invention.

Moreover, the controller 10 includes a timing controller 14 for controlling timing at which cleaning of the CCD 2 is performed. For example, the timing controller 14 carries out control so that cleaning is performed when the switching count of the optical filter 4 has reached a given count. The switching count of the optical filter 4 is increased in proportion to the duration of use of the camera apparatus 1, and can therefore be used as an index of timing for the cleaning of the CCD 2. Further, the timing controller 14 may carry out control so that cleaning is performed when a given period of time has elapsed since the previous cleaning, or may carry out control so that cleaning is performed at regular time intervals (e.g., once a week or once a month). This timing controller 14 is equivalent to a timing control means of the present invention.

The camera apparatus 1 includes a storage 15 formed by a memory or the like, and the time at which cleaning has been performed and/or the number of times the cleaning has been performed, the time at which switching of the optical filter 4 has been performed and/or the number of times the switching has been performed, etc., are stored as cleaning history information in the storage 15. Besides, the camera apparatus 1 includes a display 16 formed by a liquid crystal display or the like, and the above-mentioned cleaning history information is displayed on the display 16. In this embodiment, the storage 15 is equivalent to a storage means of the present invention, and the display 16 is equivalent to a display means of the present invention.

Moreover, the camera apparatus 1 includes a white defects corrector 17 for performing a white defects correction process on the CCD 2, and the controller 10 includes a light shielding controller 18 for performing light shielding control of the CCD 2 by utilizing the cleaning controller 13. With the light to the CCD 2 blocked, the white defects corrector 17 detects a white defects (pixel defect) of the CCD 2, and an image processing technique is used, thereby correcting the white defects. The light shielding controller 18 is formed so as to carry out the light shielding control of the CCD 2 when a request is issued from the white defects corrector 17. Further, the light shielding controller 18 is formed so as to carry out the light shielding control of the CCD 2 also when a light shielding control request for privacy protection is issued from a user.

Influences on an output image caused by a flaw of the CCD 2 include a case where the flaw appears more blackish than it actually is due to a level reduction in a defective element output (which will also be referred to as a "black flaw"), and a case where the flaw appears more whitish due to a level increase (which will also be referred to as a "white defects"), but in particular, the latter case (white defects) is more conspicuous for the final image.

Methods for detecting and correcting a flawed element include a method in which light incident on the CCD is blocked, for example, to provide a uniform screen, a pixel having a significant level difference as compared with other pixels is determined as a defect, and video signal processing is carried out on this defect by the white defects corrector 17, thereby making the defect inconspicuous.

The determination of presence or absence of this defective pixel includes a method in which a video level difference is determined by signal processing to automatically detect a coordinate, and a method in which a user manually designates a coordinate by looking at a screen. In other words, it can be said that as white defects correction means, there are two methods including automatic detection and manual designation.

For example, the white defects corrector 17 detects and corrects a flaw by automatically performing light shielding in order to automatically detect the flaw. Alternatively, light shielding may be performed in response to an external instruction from a user interface or the like, and manual designation may be performed while a correction effect is confirmed on the screen.

Figure 2:
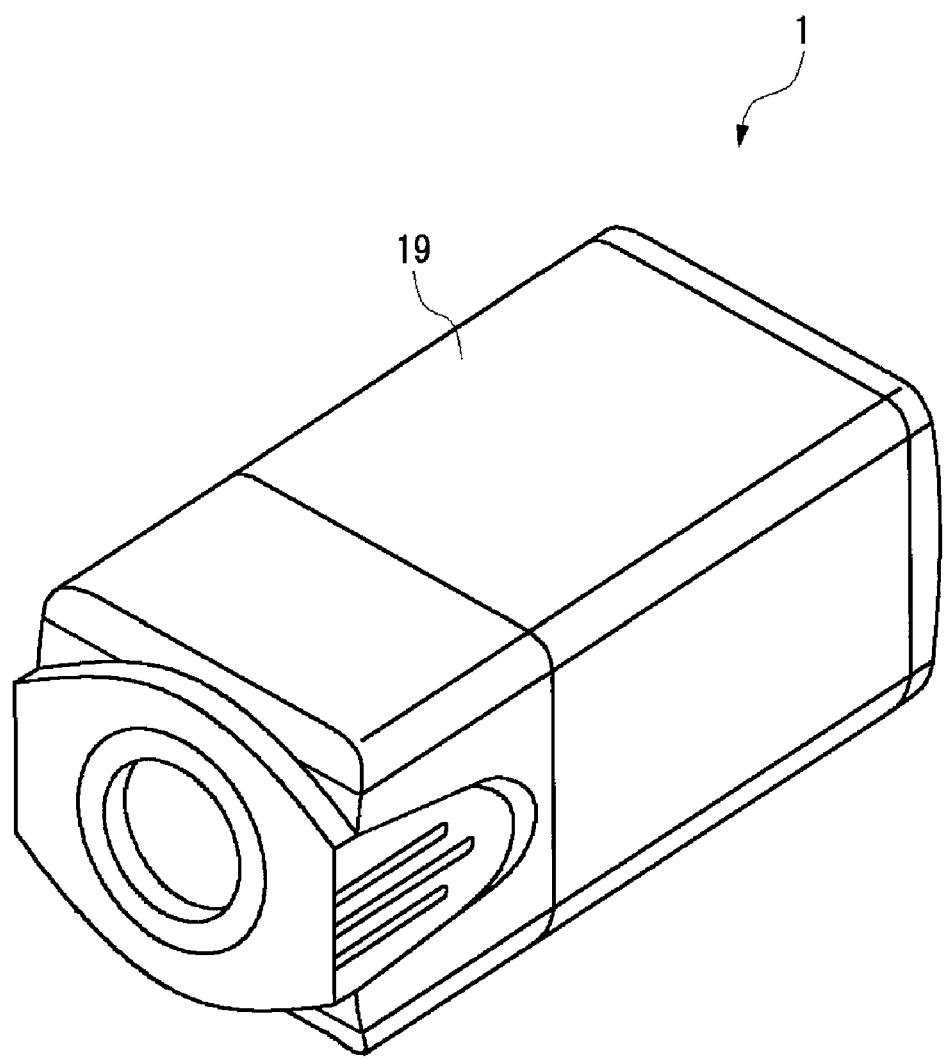
FIG. 2 is a perspective view illustrating an appearance of the camera apparatus of the present embodiment.

Next, each component of the camera apparatus 1 will be specifically described with reference to the drawings. FIG. 2 is a perspective view illustrating an appearance of the camera apparatus 1, and FIG. 3 is an exploded perspective view for describing each component inside the camera apparatus 1.

As illustrated in FIG. 2, the camera apparatus 1 includes a box-shaped main body case 19, and is formed so that a lens (not illustrated) is attached to a front face of the main body case 19. As illustrated in FIG. 3, the main body case 19 is provided at its inside with: the CCD 2 placed on an optical path of the lens; and the ABF frame 8 to which the CCD 2 is attached. Further, a base frame 21 is provided in front of the CCD 2, and a filter frame 22 to which the optical filter 4 is attached, and a link member 23 to which the cleaning member 3 is attached are attached to this base frame 21.

Figure 3:
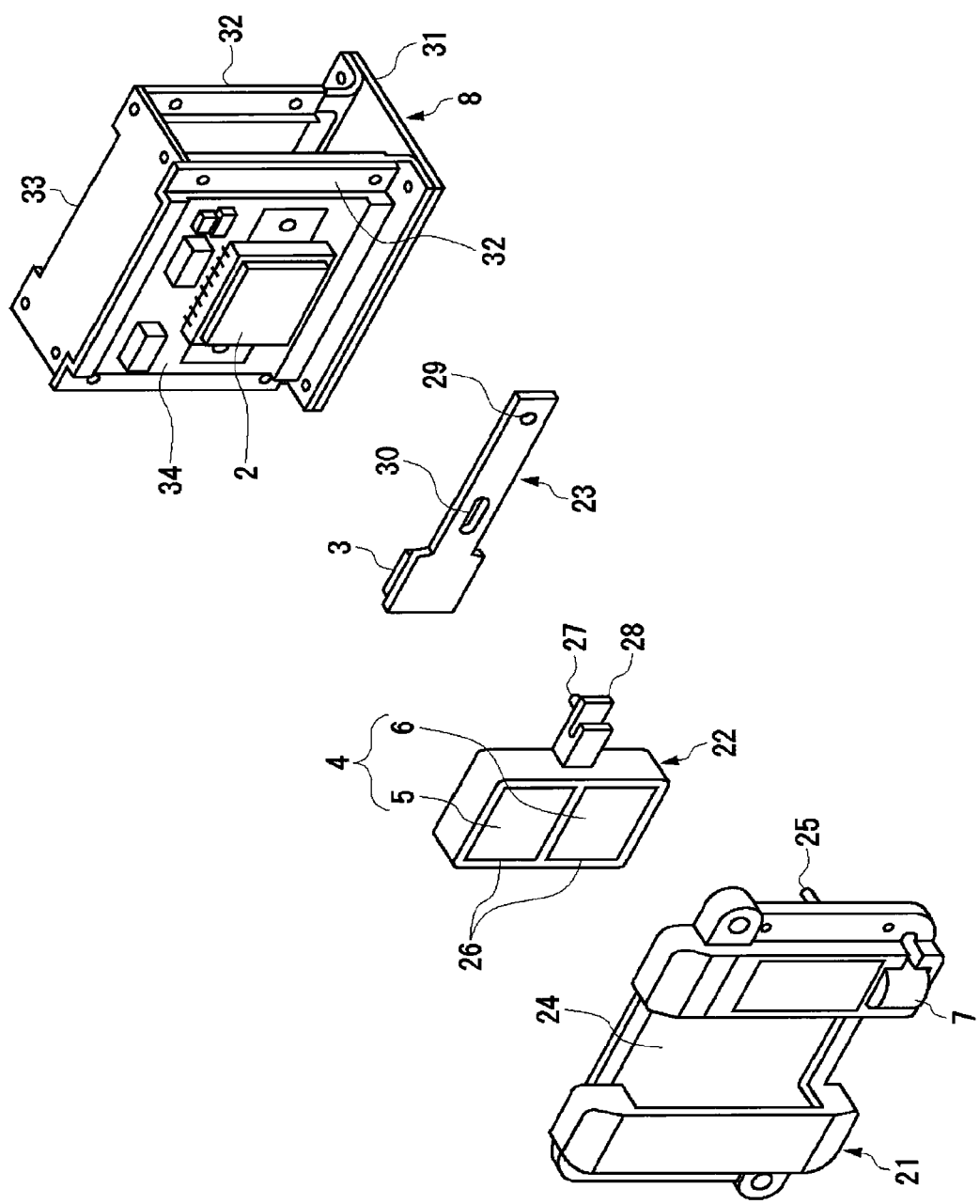
FIG. 3 is an exploded perspective view for describing an internal structure of the camera apparatus of the present embodiment.
Figure 4:
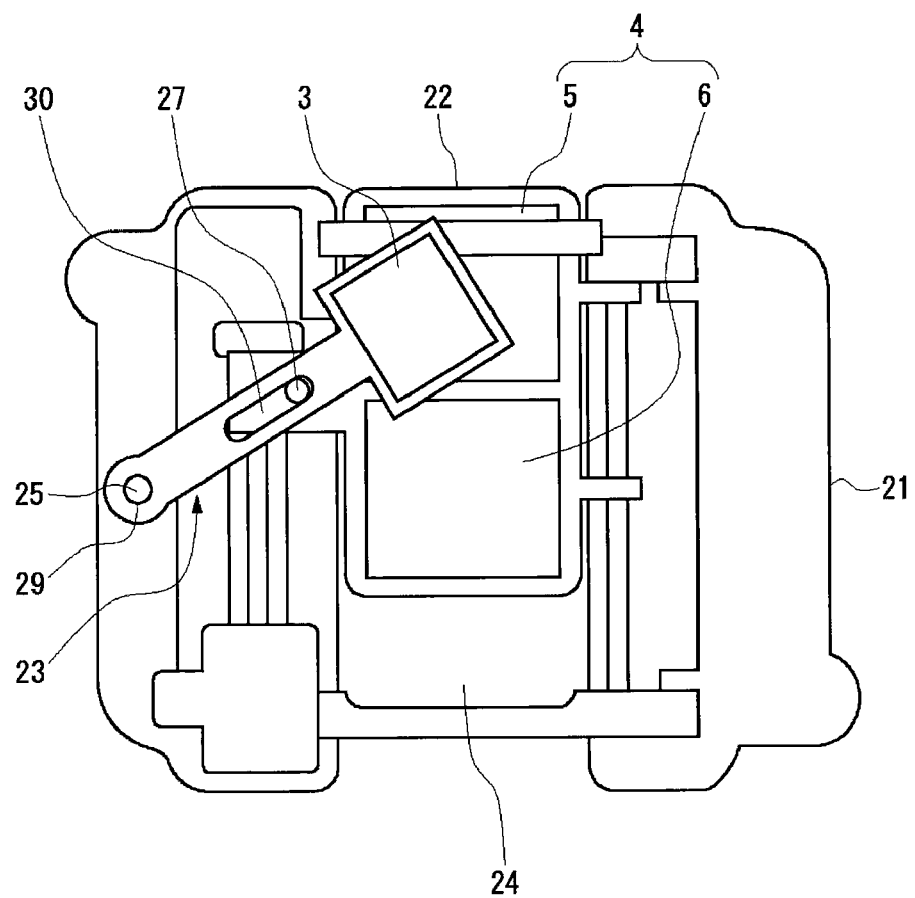
FIG. 4 is an explanatory diagram illustrating the locations of an optical filter and a cleaning member of the camera apparatus (black-and-white mode) of the present embodiment.
Figure 5:
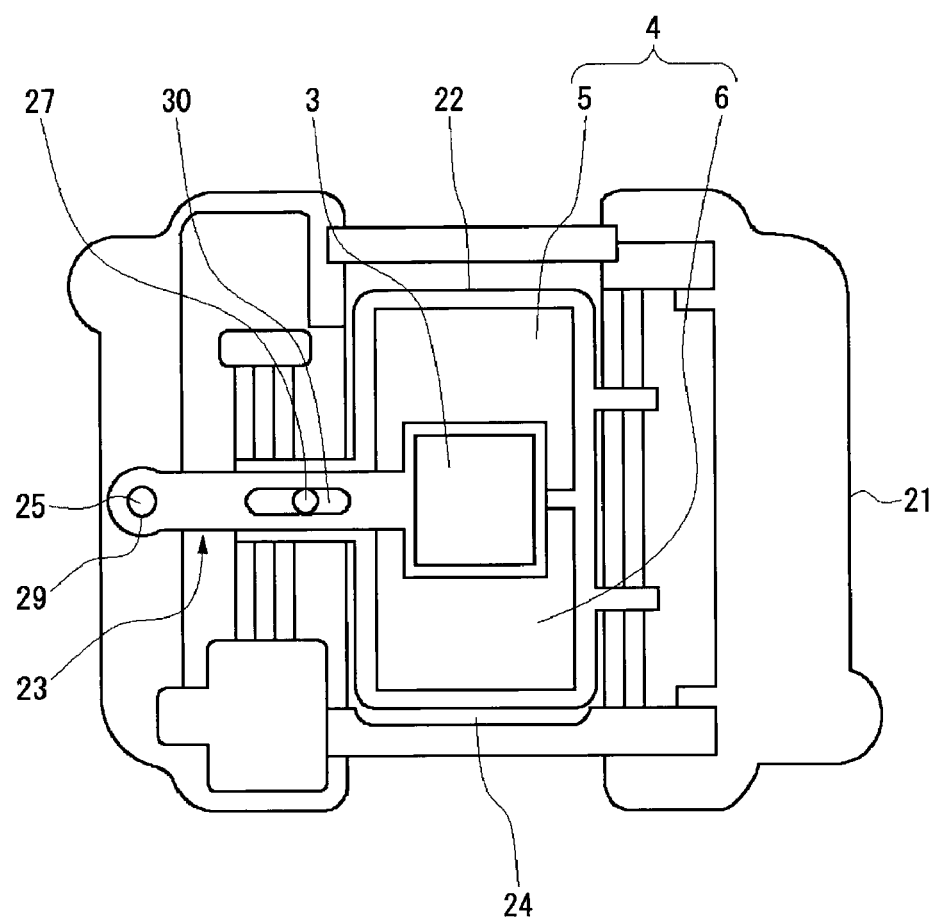
FIG. 5 is an explanatory diagram illustrating the locations of the optical filter and cleaning member of the camera apparatus (cleaning mode, light shielding mode) of the present embodiment.
Figure 6:
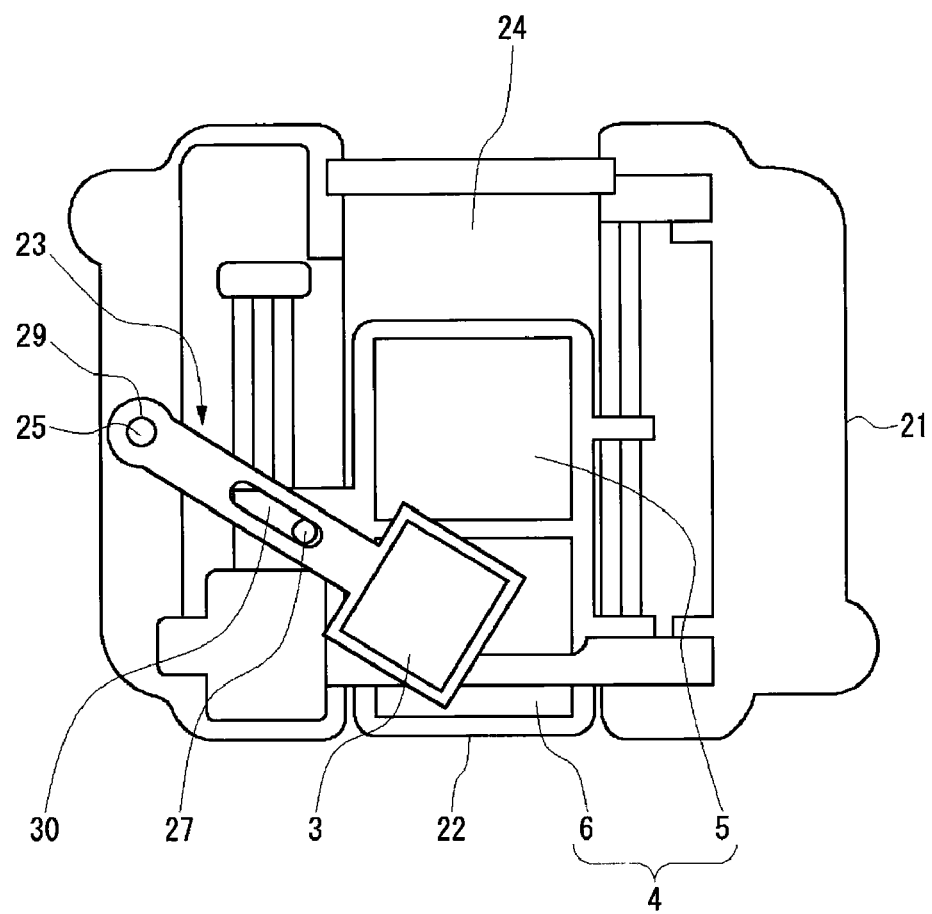
FIG. 6 is an explanatory diagram illustrating the locations of the optical filter and cleaning member of the camera apparatus (color mode) of the present embodiment.

At the center of the base frame 21, an opening window portion 24 is provided (see FIG. 3), and the filter frame 22 is attached to this opening window portion 24 so as to be slidable upward/downward (see FIGS. 4 to 6). It can also be said that this filter frame 22 is guided so as to be slidable only upward/downward (i.e., upward/downward in FIGS. 4 to 6) via the opening window portion 24. Furthermore, the base frame 21 is provided with: the filter drive motor 7 for generating a drive force for causing the filter frame 22 to be slid; and a rotation pin 25 to which a rotational drive force of the filter drive motor 7 is transmitted.

As illustrated in FIG. 3, the filter frame 22 is provided with two filter attachment holes 26 one above the other, and the color filter 5 and the black-and-white filter 6 are attached to the respective filter attachment holes 26. In addition, the filter frame 22 is provided at its lateral portion with a protrusive piece 28 at which a connecting pin 27 is protrusively provided.

At a tip end of the link member 23, the cleaning member 3 is attached (see FIGS. 4 to 6). Further, at a basal end of the link member 23, there is provided a fixation hole 29 through which the rotation pin 25 is fixed, and at an intermediate portion of the link member 23 (i.e., the intermediate portion between the tip end and basal end thereof), there is provided an elongated hole 30 into which the connecting pin 27 is slidably inserted. This link member 23 is rotatable using the rotation pin 25 as a rotation center due to a rotational drive force transmitted from the filter drive motor 7 via the rotation pin 25. Thus, the filter frame 22 and the cleaning member 3 are connected so as to be operated in conjunction with each other via the link member 23 (see FIGS. 4 to 6). In this embodiment, the link member 23 is equivalent to a link means of the present invention.

In this case, it can also be said that the position at which the cleaning member 3 is attached (i.e., the tip end of the link member 23) is located at a position farther away from the position of the rotation pin 25 (i.e., the basal end of the link member 23) than the position at which the filter frame 22 is connected (i.e., the intermediate portion of the link member 23). Accordingly, the tip end of the link member 23 is equivalent to the connected position of the cleaning means of the present invention, and the intermediate portion of the link member 23 is equivalent to the connected position of the optical filter means of the present invention.

Figure 8:
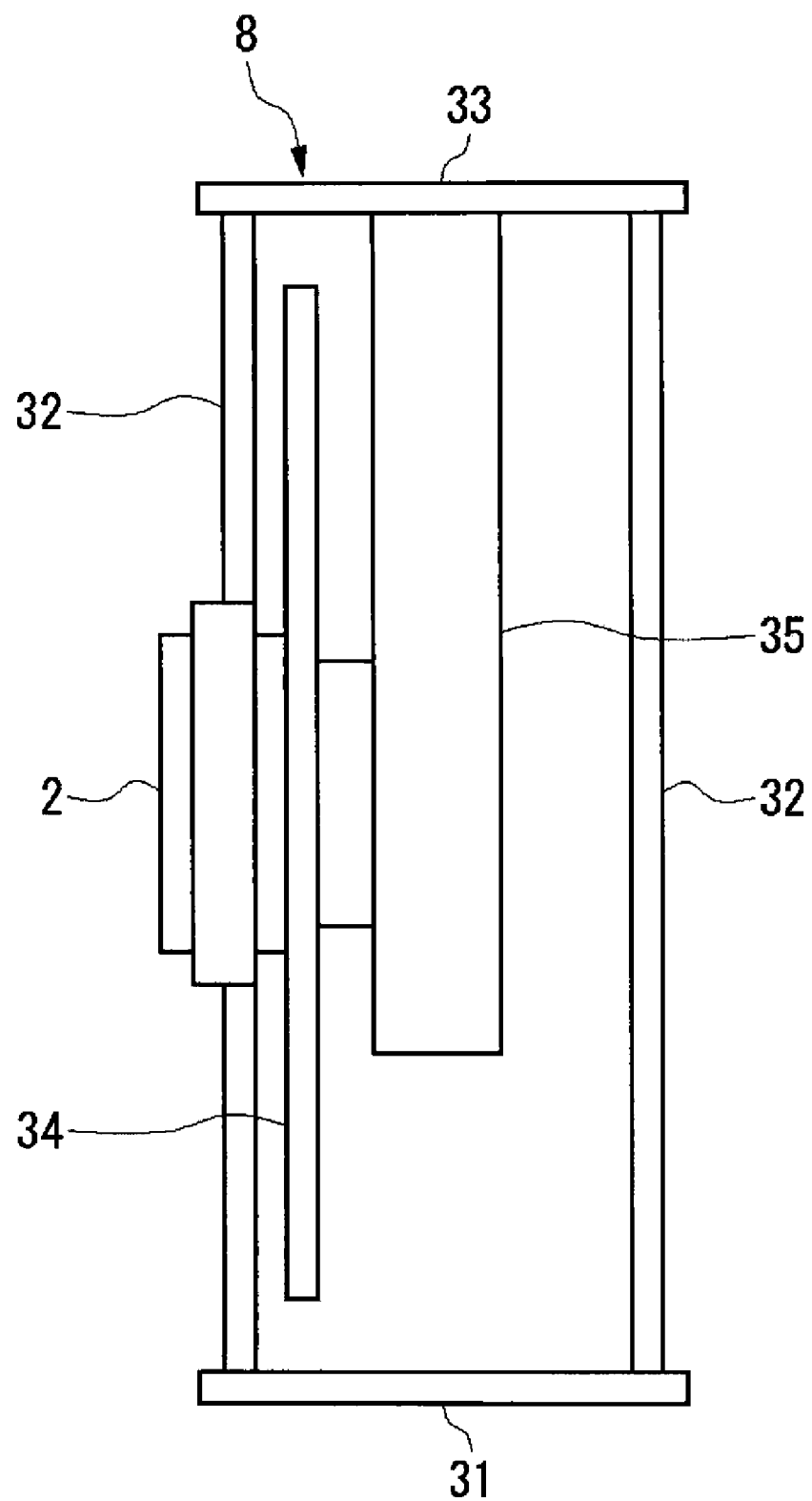
FIG. 8 is a side view of an ABF frame (shooting mode) of the camera apparatus of the present embodiment.
Figure 9:
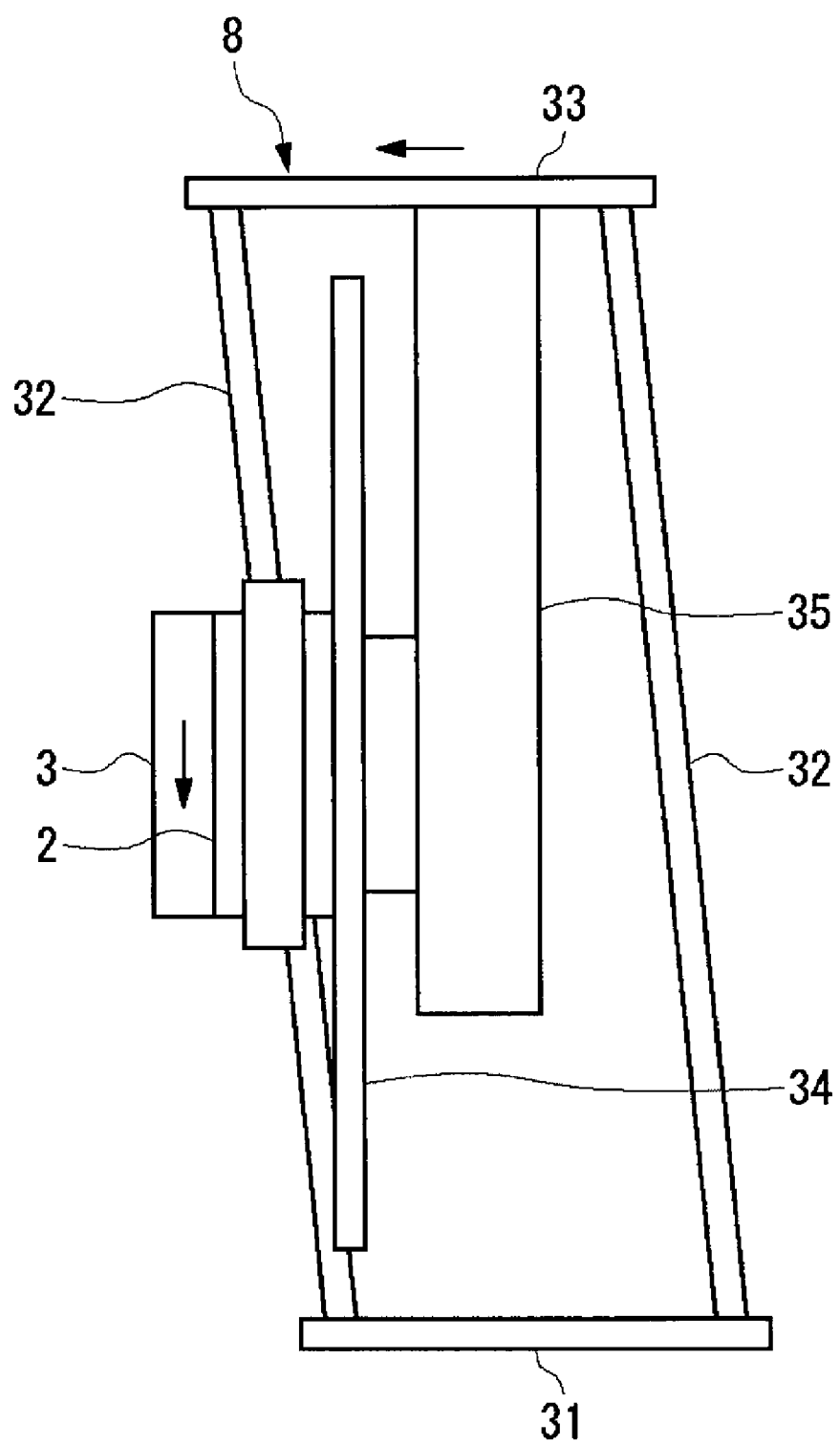
FIG. 9 is a side view of the ABF frame of the camera apparatus of the present embodiment (when a CCD and a cleaning member are at a contact position).
Figure 10:
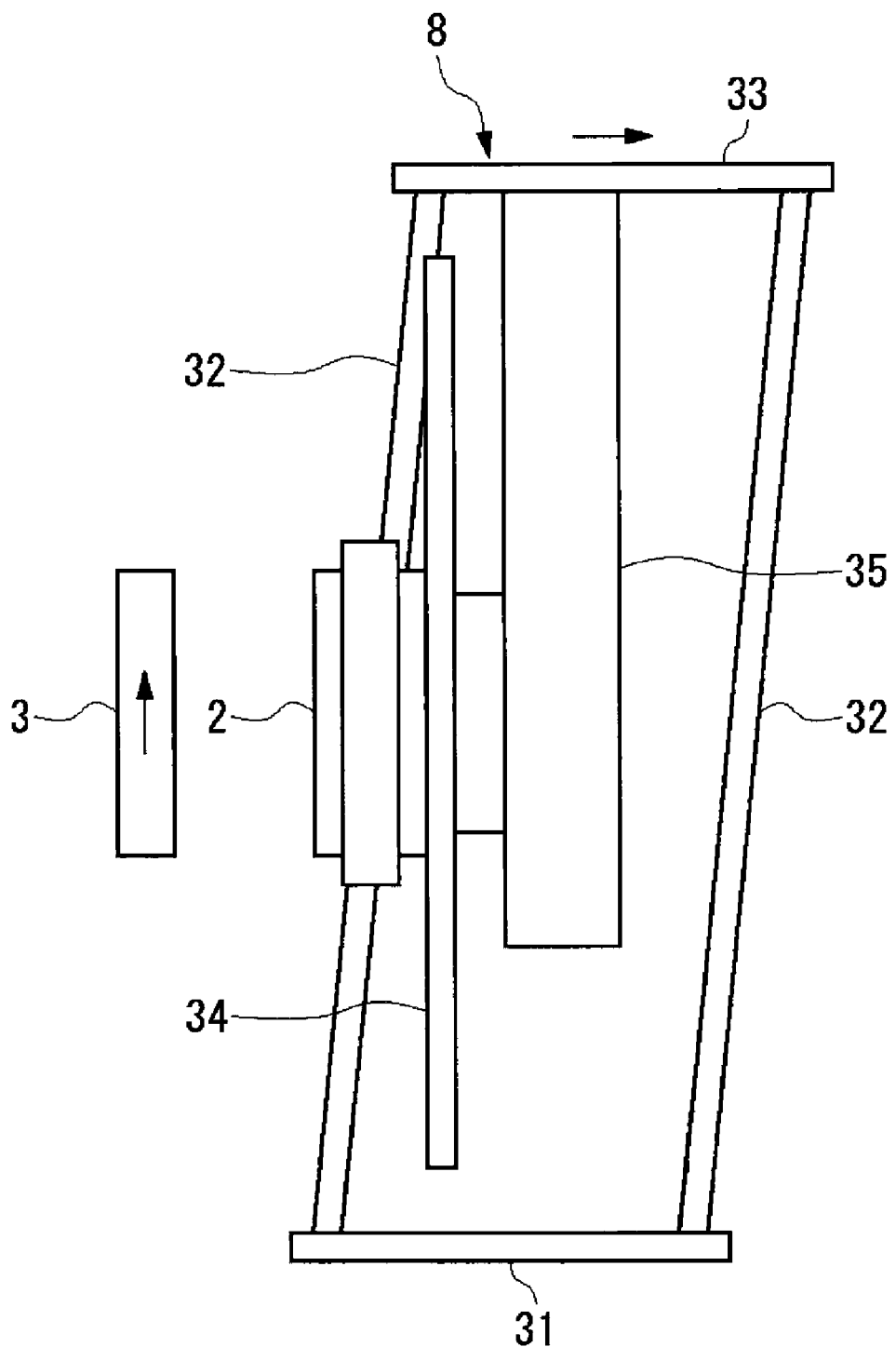
FIG. 10 is a side view of the ABF frame of the camera apparatus of the present embodiment (when the CCD and cleaning member are at a non-contact position).

The ABF frame 8 includes: a lower face frame 31 fixed to the main body case 19; a pair of front and rear support frames 32 vertically provided at a top face of the lower face frame 31; and an upper face frame 33 supported by the support frames 32 (see FIGS. 8 to 10). At a bottom face of the upper face frame 33, an attachment frame 35, to which a mounting board 34 mounted with the CCD 2 and the like is attached, is perpendicularly provided. The ABF frame 8 is formed so that the support frames 32 are inclined forward/backward and the upper face frame 33 can be moved forward/backward (in the optical axis direction) by a drive force of the ABF drive motor 9 (see FIGS. 9 and 10). In other words, this ABF frame 8 is formed so that the CCD 2 can be moved forward/backward by a drive force of the ABF drive motor 9.

Operations of the camera apparatus 1 formed as described above will be described with reference to the drawings. The camera apparatus 1 of the present embodiment is provided with a color mode suitable for daytime shooting, and a black-and-white mode suitable for nighttime shooting. Furthermore, the camera apparatus 1 of the present embodiment is provided with a cleaning mode in which cleaning of the CCD 2 is performed, and a light shielding mode in which light shielding of the CCD 2 is performed.

(Upward/Downward Movements of Optical Filter 4 and Cleaning Member 3)

Figure 7:
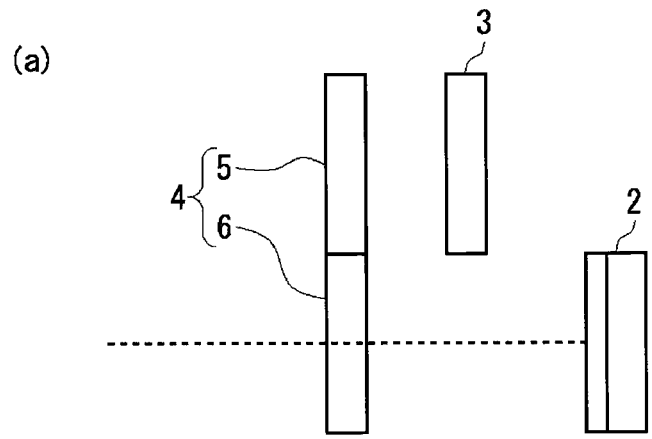
FIG. 7 (*a*) is a side view illustrating the locations of principal components of the camera apparatus (black-and-white mode) of the present embodiment, (*b*) is a side view illustrating the locations of the principal components of the camera apparatus (cleaning mode, light shielding mode) of the present embodiment, and (*c*) is a side view illustrating the locations of the principal components of the camera apparatus (color mode) of the present embodiment.
Figure 7:
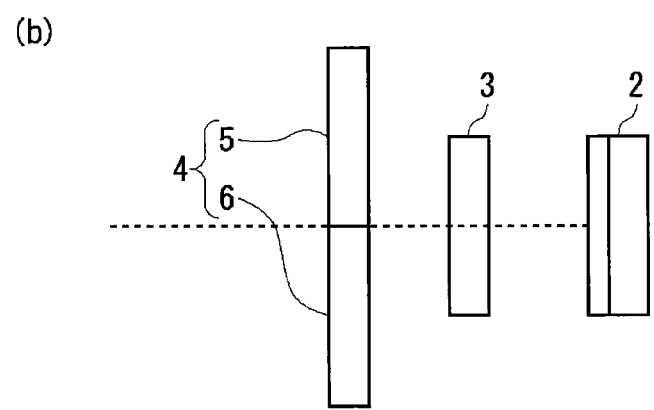
Figure 7:
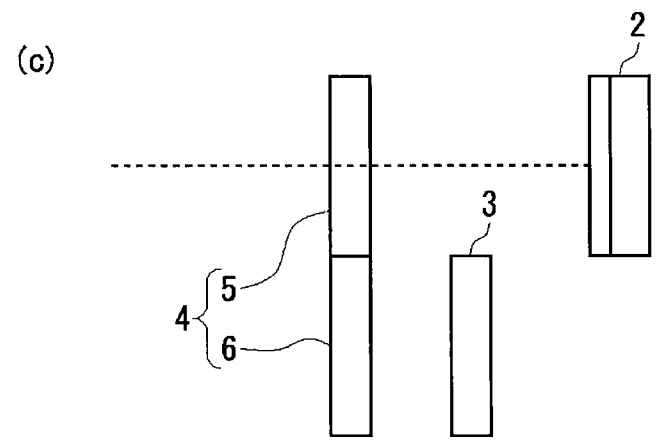

Hereinafter, operations of the filter frame 22 and the link member 23 (i.e., upward/downward movements of the optical filter 4 and the cleaning member 3) during each mode will be first described with reference to FIGS. 4 to 7. FIG. 4 is an explanatory diagram illustrating the locations of the optical filter 4 and the cleaning member 3 during the black-and-white mode. Furthermore, FIG. 5 is an explanatory diagram illustrating the locations of the optical filter 4 and the cleaning member 3 during the cleaning mode and the light shielding mode, and FIG. 6 is an explanatory diagram illustrating the locations of the optical filter 4 and the cleaning member 3 during the color mode. FIGS. 7(a) to (c) are side views illustrating the locations of principal components (the CCD 2, cleaning member 3, and optical filter 4) during the respective modes (the black-and-white mode, cleaning mode, light shielding mode, and color mode).

(Black-and-White Mode)

When shooting is performed in the black-and-white mode, as illustrated in FIG. 4 and FIG. 7(a), the filter drive motor 7 is controlled by the filter drive controller 11, and the optical filter 4 and the cleaning member 3 are operated in conjunction with each other so as to be moved upward.

In the example illustrated in FIG. 4, the link member 23 is rotated in a counterclockwise direction, and the optical filter 4 and the cleaning member 3 are moved upward. At this point, the filter frame 22 is guided so as to be moved upward along the opening window portion 24 of the base frame 21, and the connecting pin 27 of the filter frame 22 slides toward the tip end side (i.e., toward the upper right in FIG. 4) through the inside of the elongated hole 30 of the link member 23.

Thus, the black-and-white filter 6 is placed at an inserted position located on the optical path leading to the CCD 2, and the cleaning member 3 is placed at a retracted position retracted from the front of the CCD 2. It should be noted that at this point, the color filter 5 is placed at a withdrawn position withdrawn from a position on the optical path leading to the CCD 2.

(Cleaning Mode, Light Shielding Mode)

When the apparatus is set in the cleaning mode (or the light shielding mode), as illustrated in FIG. 5 and FIG. 7(b), the filter drive motor 7 is controlled via the filter drive controller 11, and the optical filter 4 and the cleaning member 3 are placed at a center position located on the optical path. Upon setting of the apparatus in the cleaning mode (or the light shielding mode) during the black-and-white mode illustrated in FIG. 4, the optical filter 4 and the cleaning member 3 are operated in conjunction with each other so as to be moved downward, and are placed at the center position located on the optical path. On the other hand, upon setting of the apparatus in the cleaning mode (or the light shielding mode) during the color mode illustrated in FIG. 6, the optical filter 4 and the cleaning member 3 are operated in conjunction with each other so as to be moved upward, and are placed at the center position located on the optical path.

Referring to FIG. 5, the description will be made about a case where the apparatus is set in the cleaning mode during the black-and-white mode, for example. In this case, the link member 23 is rotated in a clockwise direction, and the optical filter 4 and the cleaning member 3 are moved downward. At this point, the filter frame 22 is guided so as to be moved downward along the opening window portion 24 of the base frame 21, and the connecting pin 27 of the filter frame 22 slides toward the basal end side (i.e., toward the left side in FIG. 5) through the inside of the elongated hole 30 of the link member 23.

Thus, the cleaning member 3 is placed at the cleaning position located in front of the CCD 2. At this point, about half of the black-and-white filter 6 is placed at a position withdrawn from the position on the optical path leading to the CCD 2. As described above, a position at which the filter (black-and-white filter 6) is partially withdrawn from the position located on the optical path is also included in the withdrawn position of the present invention. It should be noted that although about half of the color filter 5 is inserted into the position located on the optical path leading to the CCD 2, it can also be said that about half of this color filter 5 is placed at a position withdrawn from the position on the optical path leading to the CCD 2. Accordingly, in this case, it can be said that both of the black-and-white filter 6 and the color filter 5 are each placed at the withdrawn position.

(Color Mode)

When shooting is performed in the color mode, as illustrated in FIG. 6 and FIG. 7(c), the filter drive motor 7 is controlled by the filter drive controller 11, and the optical filter 4 and the cleaning member 3 are operated in conjunction with each other so as to be moved downward.

In the example illustrated in FIG. 6, the link member 23 is rotated in a clockwise direction, and the optical filter 4 and the cleaning member 3 are moved downward. At this point, the filter frame 22 is guided so as to be moved downward along the opening window portion 24 of the base frame 21, and the connecting pin 27 of the filter frame 22 slides toward the tip end side (i.e., toward the lower right in FIG. 6) through the inside of the elongated hole 30 of the link member 23.

Thus, the color filter 5 is placed at the inserted position located on the optical path leading to the CCD 2, and the cleaning member 3 is placed at the retracted position retracted from the front of the CCD 2. It should be noted that at this point, the black-and-white filter 6 is placed at the withdrawn position withdrawn from the position located on the optical path leading to the CCD 2.

(Forward/Backward Movement of CCD 2)

Next, operations of the ABF frame 8 (i.e., forward/backward movement of the CCD 2) will be described with reference to FIGS. 8 to 10. This ABF frame 8 is essentially operated in order to perform focus adjustment by moving the CCD 2 forward/backward (in the optical axis direction). However, hereinafter, the description will be centered on an operation by which the CCD 2 is moved forward/backward when the cleaning of the CCD 2 is performed.

FIG. 8 is a side view of the ABF frame 8 of the camera apparatus 1 during a shooting mode (in the black-and-white mode or the color mode). Furthermore, FIG. 9 is a side view of the ABF frame 8 when the CCD 2 and the cleaning member 3 are located at a contact position, and FIG. 10 is a side view of the ABF frame 8 when the CCD 2 and the cleaning member 3 are located at a non-contact position.

As already described with reference to FIG. 7, during the normal shooting mode (in the black-and-white mode or the color mode), the cleaning member 3 (not illustrated in FIG. 8) is placed at the retracted position retracted from the front of the CCD 2. Upon setting of the camera apparatus 1 in the cleaning mode (or the light shielding mode), the cleaning member 3 is placed at the cleaning position located in front of the CCD 2 (see FIGS. 9 and 10).

As illustrated in FIG. 9, during the cleaning mode, the cleaning controller 13 drives the ABF drive motor 9 via the ABF drive controller 12, thereby deforming the ABF frame 8 and moving the CCD 2 forward (i.e., toward the left side in FIG. 9). Thus, the front face of the CCD 2 and the cleaning member 3 are placed at the position (contact position) at which they are brought into contact with each other. Then, with the front face of the CCD 2 and the cleaning member 3 coming into contact with each other, the cleaning controller 13 drives the filter drive motor 7 via the filter drive controller 11, thereby reciprocating the cleaning member 3 upward/downward together with the optical filter 4. In this manner, wipe-off cleaning of the front face of the CCD 2 is carried out.

As illustrated in FIG. 10, the cleaning controller 13 drives the ABF drive motor 9 via the ABF drive controller 12, thereby deforming the ABF frame 8 and moving the CCD 2 backward (toward the right side in FIG. 10); then, the front face of the CCD 2 and the cleaning member 3 are placed at the position (non-contact position) at which they are not brought into contact with each other. In the present embodiment, with the front face of the CCD 2 and the cleaning member 3 kept from contact with each other, the cleaning member 3 is moved to the cleaning position located in front of the CCD 2.

Further, in the present embodiment, when the cleaning member 3 is moved forth downward as illustrated in FIG. 9, the CCD 2 is moved forward (i.e., toward the left side in FIG. 9), thereby placing the front face of the CCD 2 and the cleaning member 3 at the contact position. On the other hand, when the cleaning member 3 is moved back upward as illustrated in FIG. 10, the CCD 2 is moved backward (i.e., toward the right side in FIG. 10), thereby placing the front face of the CCD 2 and the cleaning member 3 at the non-contact position (see FIG. 10).

(Cleaning Control)

Figure 11:
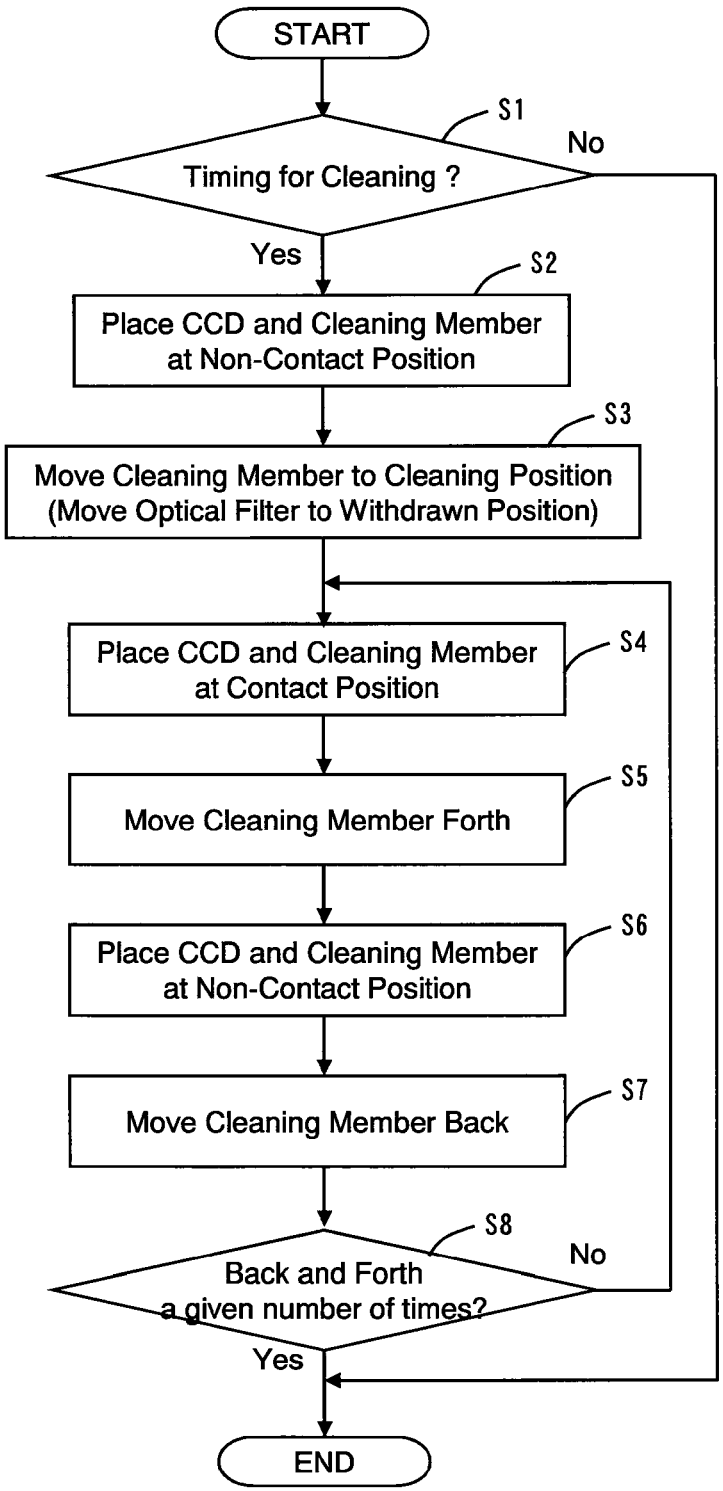
FIG. 11 is a flow chart for describing the flow of operations when wipe-off cleaning of a CCD surface is carried out in the present embodiment.

Next, the flow of cleaning control carried out when the apparatus is set in the cleaning mode will be described with reference to FIG. 11. FIG. 11 is a flow chart illustrating the flow of the cleaning control. As illustrated in FIG. 11, upon start of the cleaning control, it is first determined whether or not it is timing for cleaning of the CCD 2 (S1). For example, when the switching count of the optical filter 4 has exceeded a given count, it is determined that it is timing for cleaning. Alternatively, when a given period of time has elapsed since the previous cleaning, it is determined that it is timing for cleaning. Or when the time for scheduled cleaning, which is performed at regular time intervals (e.g., once a week or once a month), has come, it is determined that it is timing for cleaning.

When it is determined by the timing controller 14 that it is timing for cleaning, the cleaning controller 13 drives the ABF drive motor 9 via the ABF drive controller 12, thereby placing the CCD 2 and the cleaning member 3 at the non-contact position (S2). Next, the cleaning controller 13 drives the filter drive motor 7 via the filter drive controller 11, thereby moving the cleaning member 3 to the cleaning position (S3). It should be noted that the optical filter 4 is moved to the retracted position in conjunction with the movement of the cleaning member 3.

Then, the control for moving back and forth the cleaning member 3 is carried out. In this case, first, the cleaning controller 13 drives the ABF drive motor 9 via the ABF drive controller 12, thereby bringing the CCD 2 and the cleaning member 3 into contact with each other (S4). Thereafter, the cleaning controller 13 drives the filter drive motor 7 via the filter drive controller 11, thereby advancing the cleaning member 3 in one direction (e.g., in the downward direction) (S5).

Subsequently, the cleaning controller 13 drives the ABF drive motor 9 via the ABF drive controller 12, thereby pulling away the CCD 2 and the cleaning member 3 from each other (S6). Thereafter, the cleaning controller 13 drives the filter drive motor 7 via the filter drive controller 11, thereby moving back the cleaning member 3 toward the original position (e.g., in the upward direction) (S7).

When the above-described back and forth movement has been repeated a given number of times, the cleaning control ends (S8). In other words, the back and forth movement of the cleaning member 3 is repeated until the back and forth movement is performed a given number of times.

(Light Shielding Control)

Next, operations performed when light shielding control is carried out will be described. In the present embodiment, the white defects corrector 17 issues a light shielding request to the light shielding controller 18 when white defects correction is performed on the CCD 2. Furthermore, the light shielding request is sent to the light shielding controller 18, for example, when shooting is stopped for privacy protection.

The light shielding controller 18, which has received the light shielding request, drives the filter drive motor 7 via the cleaning controller 13 and/or the filter drive controller 11, thereby moving the cleaning member 3 to the light shielding position (cleaning position).

In this camera apparatus 1 according to the embodiment of the present invention, the cleaning member 3 and the cleaning controller 13 are provided in the camera apparatus 1; thus, the camera apparatus 1 itself is provided with the function of cleaning the CCD 2, thereby enabling reduction in time and effort for a cleaning operation performed on the CCD 2.

Specifically, in the present embodiment, the cleaning of the front face of the CCD 2 (i.e., the surface of the CCD 2) can be performed by the cleaning member 3 included in the camera apparatus 1 itself. More specifically, the detachment of a lens, which has been performed in the conventional technology, is unnecessary at the time of removal of a foreign substance adhered to the front face of the CCD 2. Accordingly, it is possible to perform the cleaning of the CCD 2 without disassembling the camera apparatus 1, thereby facilitating the cleaning operation performed on the CCD 2.

Further, in the present embodiment, the cleaning member 3 and the optical filter 4 are operated in conjunction with each other, thereby placing the optical filter 4 at the inserted position when the cleaning member 3 is located at the retracted position. Accordingly, shooting can be performed by the CCD 2 when the cleaning of the CCD 2 is not performed. Furthermore, the cleaning member 3 and the optical filter 4 are operated in conjunction with each other, thereby placing the optical filter 4 at the withdrawn position when the cleaning member 3 is located at the cleaning position. Accordingly, the cleaning of the CCD 2 can be performed when shooting is not performed by the CCD 2.

In addition, in the present embodiment, the cleaning member 3 and the optical filter 4 are operated in conjunction with each other via the link means, thus enabling the shared use of the drive motor for moving the cleaning member 3 and for moving the optical filter 4. Accordingly, a drive motor for moving the cleaning member 3 does not have to be additionally provided, which enables the size reduction of the product, and allows the product cost to be kept at a low level.

Moreover, in this case, the connected position of the cleaning member 3 (the tip end of the link member 23) is located at a position (tip-end-side position) farther away from the rotation center of the link member 23 than the connected position of the optical filter 4 (the intermediate portion of the link member 23). Therefore, the amount of movement of the cleaning member 3 (i.e., the amount of movement from the cleaning position to the retracted position) will be greater than the amount of movement of the optical filter 4 (i.e., the amount of movement from the inserted position to the withdrawn position). Thus, when the optical filter 4 is moved from the position (i.e., the withdrawn position) located outside the optical path to the position (i.e., the inserted position) located on the optical path, the cleaning member 3 can be reliably moved from the position (i.e., the cleaning position) located on the optical path to the position (i.e., the retracted position) located outside the optical path.

Further, in the present embodiment, wipe-off cleaning is performed by bringing the cleaning member 3 into contact with the front face of the CCD 2. Thus, dust or dirt adhered to the CCD 2 can be wiped off and removed, and a foreign substance on the CCD 2 can be more reliably removed as compared with the case where air is blown to blow off a foreign substance as in the conventional technology.

Furthermore, in the present embodiment, when the cleaning member 3 is moved to the cleaning position, the cleaning member 3 and the CCD 2 are placed at the non-contact position, and therefore, the cleaning member 3 can be prevented from interfering with the CCD 2. Then, the cleaning member 3 and the CCD 2 are placed at the contact position, thereby allowing the wipe-off cleaning of the CCD 2 to be performed.

Moreover, in the present embodiment, the CCD 2 can be moved in the optical axis direction by utilizing the ABF drive motor 9. Accordingly, it is unnecessary to additionally provide a drive source for changing the relative position of the CCD 2 and the cleaning member 3, thus enabling the size reduction of the product, and allowing the product cost to be kept at a low level.

In addition, in the present embodiment, the wipe-off cleaning is performed only when the cleaning member 3 is moved forth (i.e., moved from one end to the other end). Thus, a foreign substance such as dust or dirt, which is wiped off from the front face of the CCD 2 by the wipe-off cleaning, can be collected into the other end.

Further, in the present embodiment, the timing at which cleaning is performed is controlled, thereby performing the cleaning at suitable timing. Thus, the cleaning can be prevented from being performed excessively, which enables an increase in durability of the cleaning member 3.

Furthermore, in the present embodiment, the cleaning history information including information on the number of times the cleaning has been performed is displayed, and therefore, a user can easily confirm the cleaning history information. Thus, the user is allowed to easily perceive the timing of maintenance (repair and/or exchange) of the cleaning member 3.

Moreover, in the present embodiment, the cleaning member 3 has a light shielding property, and upon placement of the cleaning member 3 at the cleaning position (light shielding position), light shielding of the CCD 2 is carried out. By carrying out the light shielding of the CCD 2 in this manner, a white defects correction process can be performed on the CCD 2, for example. In addition, when this camera apparatus 1 is used in a videoconference system or the like, for example, the light shielding of the CCD 2 is carried out as described above, thereby preventing an image of this side from being taken to enable privacy protection.

Although the embodiment of the present invention has been described based on examples thus far, the scope of the present invention is not limited to these examples, and change or modification may be made in accordance with its object within the scope described in claims.

Figure 12:
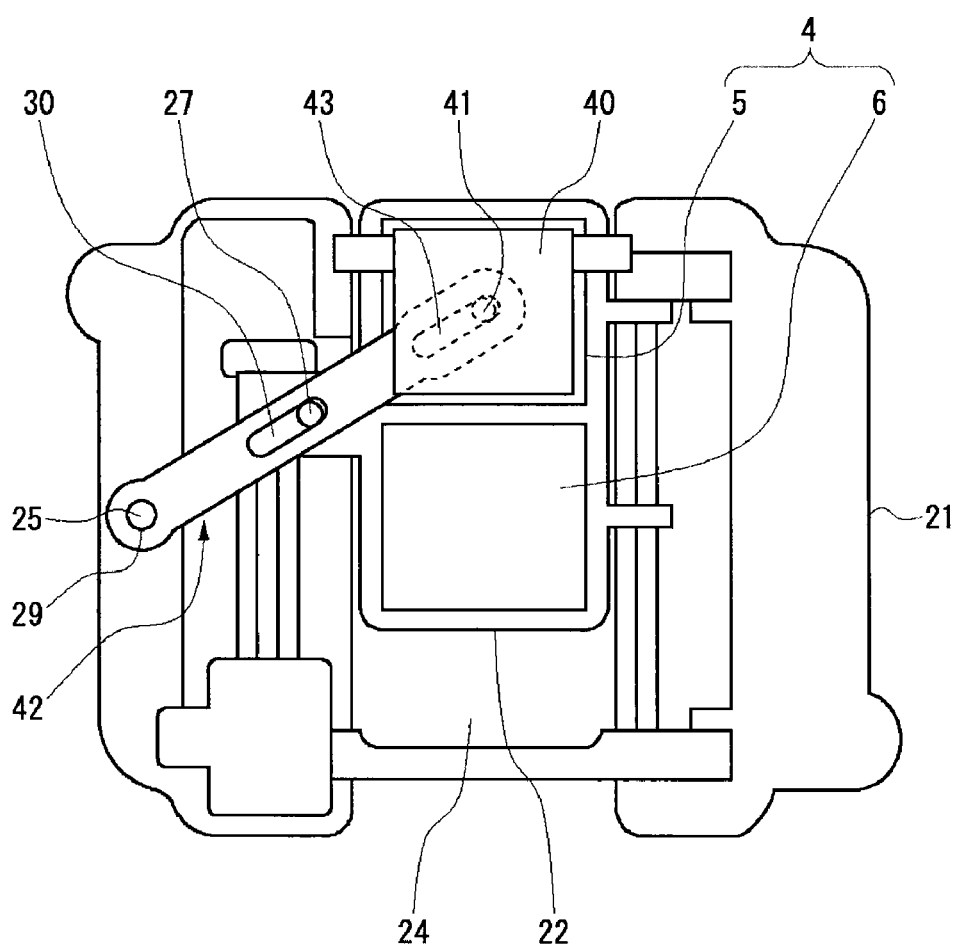
FIG. 12 is an explanatory diagram illustrating the locations of an optical filter and a cleaning member of a camera apparatus (black-and-white mode) of another embodiment.
Figure 13:
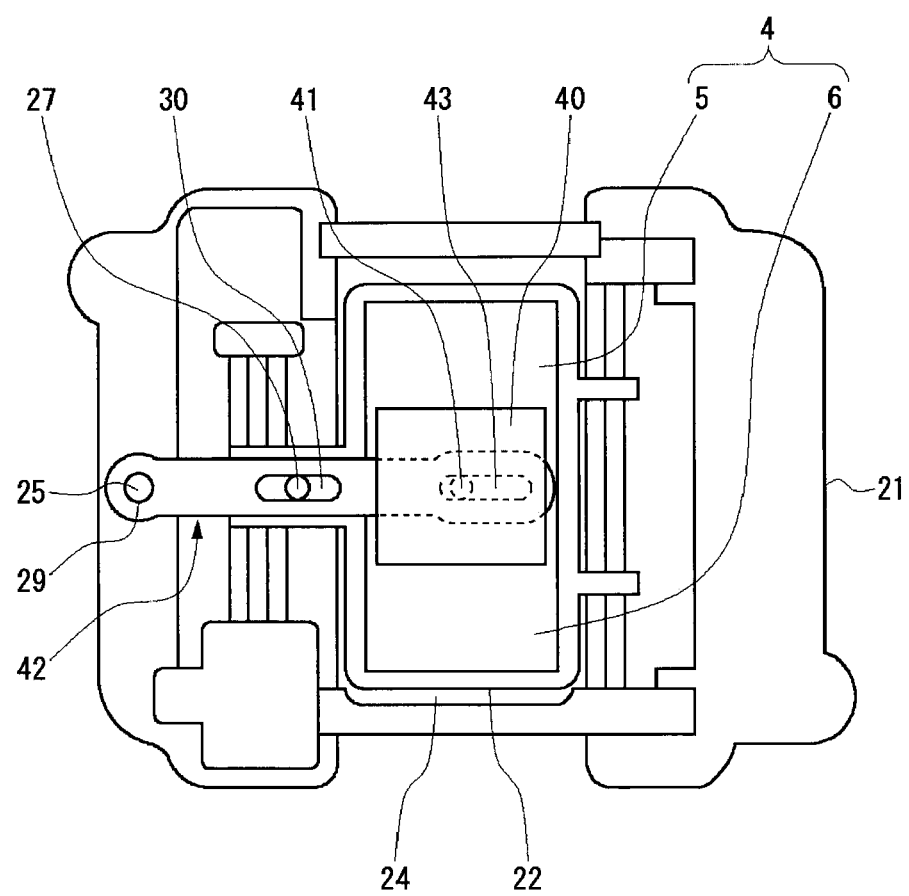
FIG. 13 is an explanatory diagram illustrating the locations of the optical filter and cleaning member of the camera apparatus (cleaning mode) of another embodiment.
Figure 14:
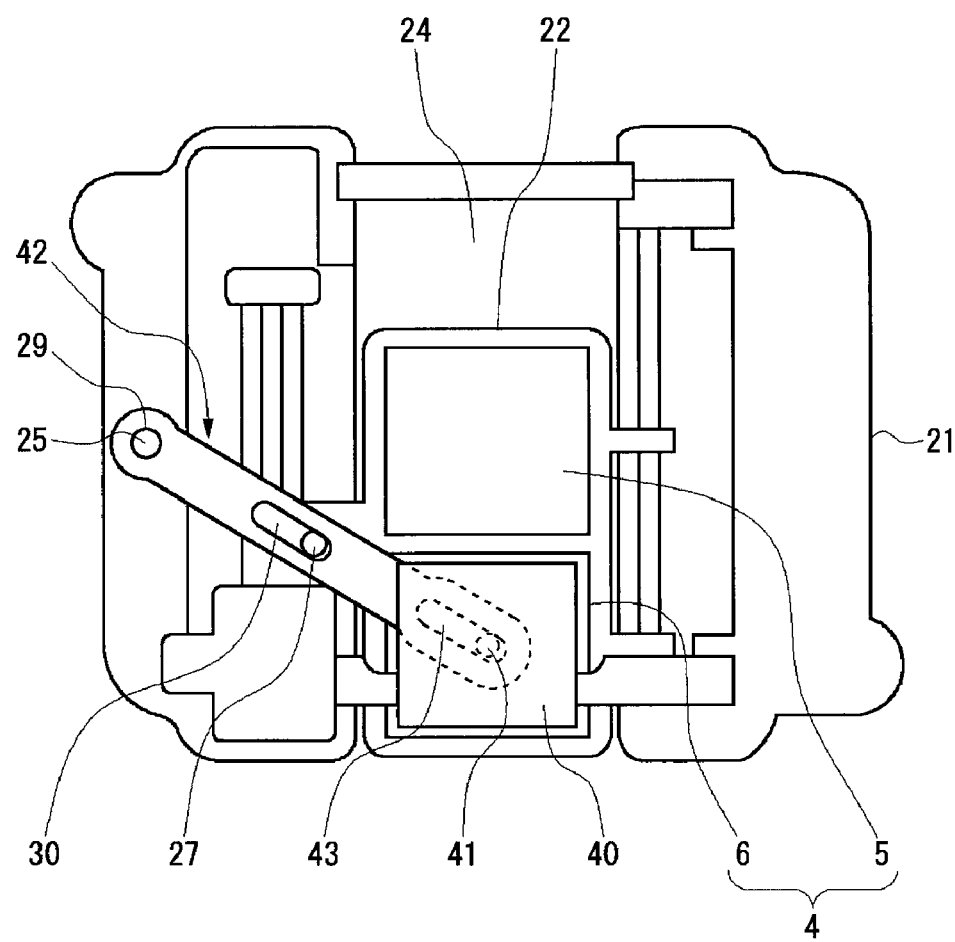
FIG. 14 is an explanatory diagram illustrating the locations of the optical filter and cleaning member of the camera apparatus (color mode) of another embodiment.

In the foregoing description, the case of using the cleaning member 3 illustrated in FIGS. 4 to 6 has been described by way of example, but the scope of the present invention is not limited to this example. For example, a cleaning member 40 according to another embodiment as illustrated in FIGS. 12 to 14 may be used. As illustrated in FIGS. 12 to 14, a connecting pin 41 is protrusively provided at a rear face of this cleaning member 40, and an elongated hole 43, into which the connecting pin 41 is slidably inserted, is provided at a tip end of a link member 42. Further, the cleaning member 40 is guided so as to be slidable only upward/downward when the link member 42 is rotated. Accordingly, when the filter frame 22 is moved upward/downward, this cleaning member 40 is also moved upward/downward in conjunction with this movement. The cleaning member 40, which is connected so as to be operated in conjunction with the filter frame 22 via the link member 42 in this manner, may be used.

Furthermore, in the foregoing description, there has been illustrated the case where the cleaning member 3 is moved forth when the cleaning member 3 and the surface of the CCD 2 are located at the contact position, and the cleaning member 3 is moved back when the cleaning member 3 and the surface of the CCD 2 are located at the non-contact position. However, the scope of the present invention is not limited to this illustration, and the cleaning member 3 may be moved back and forth when the cleaning member 3 and the surface of the CCD 2 are located at the contact position.

Moreover, in the foregoing description, there has been described the example in which the cleaning member 3 and the surface of the CCD 2 are brought into contact with each other by moving the CCD 2 forward/backward using the ABF mechanism; however, the scope of the present invention is not limited to this example, and the cleaning member and the surface of the CCD may be brought into contact with each other by moving the cleaning member forward/backward.

In the foregoing description, there has been illustrated the case where the timing at which the cleaning of the CCD 2 is performed is automatically controlled by the timing controller 14; however, the scope of the present invention is not limited to this case, and the cleaning function may be operated manually when the need for the cleaning of the CCD 2 is determined by a user.

Further, in the foregoing description, there has been illustrated the case where the cleaning control is carried out by the cleaning controller 13 provided inside the camera apparatus 1, but the scope of the present invention is not limited to this case. For example, the cleaning of the CCD 2 may be performed by an external terminal input, or the cleaning of the CCD 2 may be performed by external communication control.

In the foregoing description, there has been illustrated the case of using the cleaning member 3 for wiping off and removing a foreign substance on the surface of the CCD 2, but the scope of the present invention is not limited to this case. For example, a gas type cleaning device (which is equivalent to the cleaning means but not illustrated) for blowing gas such as air on the surface of the CCD 2 to remove a foreign substance may be used. In this case, the foreign substance adhered to the surface of the CCD 2 is blown off with air, thereby enabling removal of the foreign substance on the surface of the CCD 2. This gas type cleaning device (cleaning means) blows gas from the position (cleaning position) located in front of and in proximity to the CCD, and therefore, the foreign substance can be blown off and removed more easily as compared with a case where gas is blown from a position located laterally away from the CCD.

Alternatively, a liquid type cleaning device (which is equivalent to the cleaning means of the present invention but not illustrated) for spraying liquid such as alcohol on the surface of the CCD 2 to remove a foreign substance may be used. In this case, the foreign substance adhered to the surface of the CCD 2 is washed off with the liquid, thereby enabling removal of the foreign substance on the surface of the CCD 2. It should be noted that highly volatile alcohol or the like is preferably used as the liquid used for cleaning. The liquid such as highly volatile alcohol is volatilized in a short time, and therefore, there is no need to wipe off the liquid after cleaning.

In the foregoing description, there has been illustrated the case where the camera apparatus 1 is used as a surveillance camera; however, the scope of the present invention is not limited to this case, and the camera apparatus 1 may be a digital single-lens reflex camera, a camera for a videoconference system, etc., for example.

Although the preferred embodiment of the present invention, which is conceivable at the present time, has been described thus far, it is intended to provide an understanding of various modifications that may be made to the present embodiment, and it is also intended that the appended claims include all of such modifications falling within the true spirit and scope of the present invention.

INDUSTRIAL APPLICABILITY

As described above, in the camera apparatus according to the present invention, the camera apparatus itself is provided with the function of cleaning an imaging device, and thus has the effect of enabling reduction in time and effort for a cleaning operation performed on the imaging device; for example, the camera apparatus is used as a surveillance camera, a digital single-lens reflex camera, a camera for a videoconference system, etc., and thus has usefulness.

The invention claimed is:

1. A camera apparatus comprising:
   an imaging device;
   a cleaning member that is movable between a cleaning position and a retracted position and that performs cleaning of a front face of the imaging device, the cleaning position being a position located in front of the imaging device and in proximity to the imaging device, and the retracted position being a position retracted from the cleaning position;
   a cleaning controller which controls a movement of the cleaning member so as to move the cleaning member to the cleaning position when the cleaning is started, and so as to move the cleaning member to the retracted position when the cleaning is finished;
   an optical filter that is movable between an inserted position and a withdrawn position, the inserted position being a position located in front of the imaging device and on an optical path leading to the imaging device, and a withdrawn position being a position withdrawn from the inserted position; and
   a link member, which is rotatable by a drive force transmitted from a driver, and through which the cleaning member and the optical filter are connected.

2. The camera apparatus according to claim 1, comprising:
   a filter movement controller which controls, by using the link member, an entering and leaving movement of the optical filter in conjunction with the movement of the cleaning member between the inserted position and the retracted position.

3. The camera apparatus according to claim 2, wherein the connected position of the cleaning member is set at a position farther away from the rotation center of the link member than the connected position of the optical filter.

4. The camera apparatus according to claim 2, wherein the filter movement controller controls the entering and leaving movement of the optical filter so as to place the optical filter at the inserted position when the cleaning member is at the retracted position, and so as to place the optical filter at the withdrawn position when the cleaning member is at the cleaning position.

5. The camera apparatus according to claim 1, wherein the connected position of the cleaning member is set at a position farther away from the rotation center of the link member than the connected position of the optical filter.

6. A camera apparatus comprising:
   an imaging device;
   a cleaning member that is movable between a cleaning position and a retracted position and that performs cleaning of a front face of the imaging device, the cleaning position being a position located in front of the imaging device and in proximity to the imaging device, and the retracted position being a position retracted from the cleaning position; and
   a cleaning controller which controls a movement of the cleaning member so as to move the cleaning member to the cleaning position when the cleaning is started, and so as to move the cleaning member to the retracted position when the cleaning is finished;
   wherein the cleaning member is a wipe-off cleaning member which performs wipe-off cleaning on the front face of the imaging device by being brought into contact with the front face of the imaging device,
   wherein a relative position of the imaging device and the wipe-off cleaning member is changeable between a contact position and a non-contact position, the contact position being a position at which the front face of the imaging device and the wipe-off cleaning member are brought into contact with each other, and a non-contact position being a position at which the front face of the imaging device and the wipe-off cleaning member are not brought into contact with each other, and
   wherein the cleaning controller controls the relative position of the imaging device and the wipe-off cleaning member so as to place the imaging device and the wipe-off cleaning member at the non-contact position when the wipe-off cleaning member is moved to the cleaning position, and so as to place the imaging device and the wipe-off cleaning member at the contact position when the wipe-off cleaning is performed.

7. The camera apparatus according to claim 6,
wherein the cleaning controller controls the relative position of the imaging device and the wipe-off cleaning member so as to place the imaging device and the wipe-off cleaning member at the contact position when the wipe-off cleaning member is moved forth, and so as to place the imaging device and the wipe-off cleaning member at the non-contact position when the wipe-off cleaning member is moved back.

8. A camera apparatus comprising:

an imaging device;

a cleaning member that is movable between a cleaning position and a retracted position and that performs cleaning of a front face of the imaging device, the cleaning position being a position located in front of the imaging device and in proximity to the imaging device, and the retracted position being a position retracted from the cleaning position;

a cleaning controller which controls a movement of the cleaning member so as to move the cleaning member to the cleaning position when the cleaning is started, and so as to move the cleaning member to the retracted position when the cleaning is finished; and a focus adjustment part which adjusts a focus by moving the imaging device in an optical axis direction, wherein the cleaning controller moves the imaging device in the optical axis direction using the focus adjustment part, and controls the movement of the imaging device so as to move between a contact position and a non-contact position, the contact position being a position at which the imaging device contacts with the cleaning member, and the non-contact position being a position at which the imaging device does not contact with the cleaning member.

9. The camera apparatus according to claim 8,
wherein the cleaning controller controls the relative position of the imaging device and the wipe-off cleaning member so as to place the imaging device and the wipe-off cleaning member at the contact position when the wipe-off cleaning member is moved forth, and so as to place the imaging device and the wipe-off cleaning member at the non-contact position when the wipe-off cleaning member is moved back.

10. A camera apparatus comprising:

an imaging device;

a cleaning member that is movable between a cleaning position and a retracted position and that performs cleaning of a front face of the imaging device, the cleaning position being a position located in front of the imaging device and in proximity to the imaging device, and the retracted position being a position retracted from the cleaning position; and a cleaning controller which controls a movement of the cleaning member so as to move the cleaning member to the cleaning position when the cleaning is started, and so as to move the cleaning member to the retracted position when the cleaning is finished, wherein the cleaning member comprises a light shielding portion having a light shielding property, and wherein the cleaning controller controls the movement of the cleaning member so that when the cleaning member is at the cleaning position, the light shielding portion is placed at a light shielding position for blocking the optical path leading to the imaging device.

11. The camera apparatus according to claim 10, comprising a white defects corrector which performs a white defects correction process on the imaging device, wherein the cleaning controller controls the movement of the cleaning member so as to place the light shielding portion at the light shielding position when the white defects corrector performs the white defects correction process.

\* \* \* \* \*

UNITED STATES PATENT AND TRADEMARK OFFICE
CERTIFICATE OF CORRECTION

PATENT NO.       : 8,387,632 B2                                              Page 1 of 1
APPLICATION NO. : 12/601604
DATED            : March 5, 2013
INVENTOR(S)      : Saito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this
First Day of September, 2015

Michelle K. Lee
*Director of the United States Patent and Trademark Office*